Nov. 16, 1954 E. A. RUSSELL ET AL 2,694,527
PARKING LOT HEATING SYSTEM
Filed March 22, 1951 6 Sheets-Sheet 1

INVENTORS.
Edward A. Russell
Norman O. Kirkby
BY
Harvey M. Gillespie
Atty.

INVENTORS.
Edward A. Russell
Norman O. Kirkby
BY
Harvey M. Gillespie
Atty.

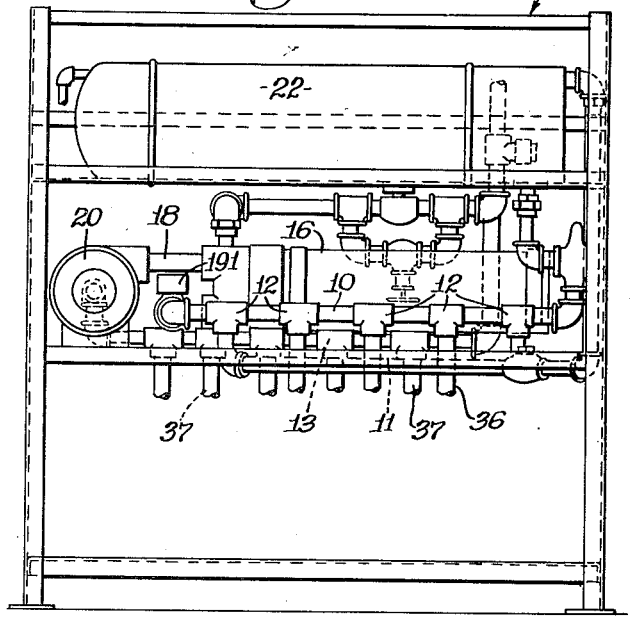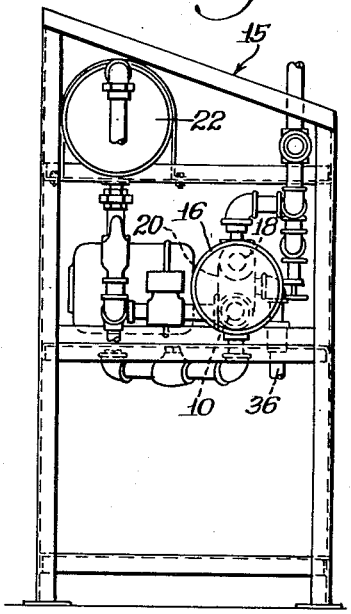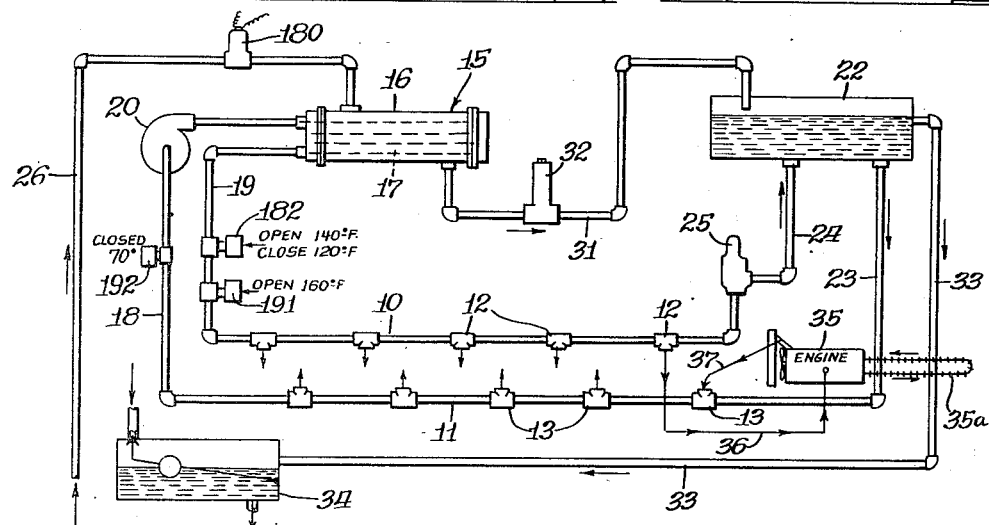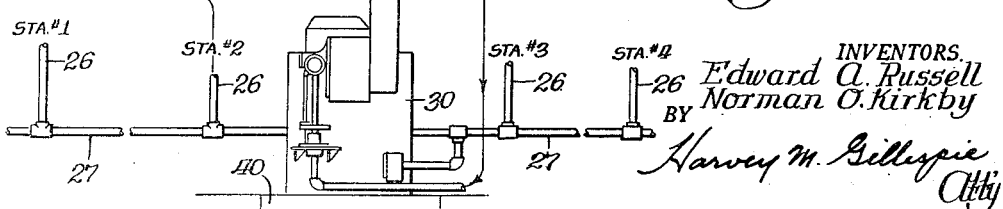

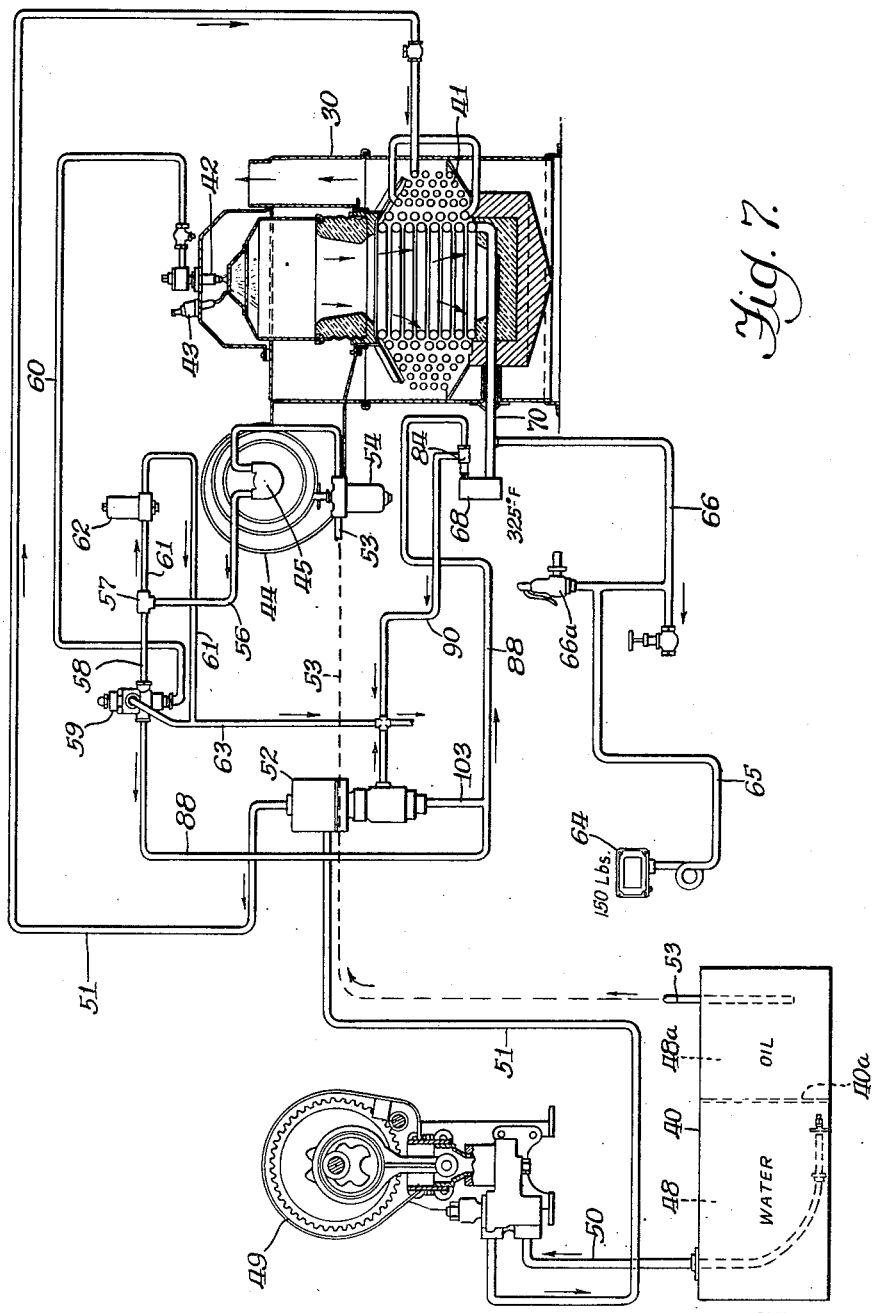

INVENTORS.
Edward A. Russell
Norman O. Kirkby
BY Harvey M. Gillespie
Atty.

United States Patent Office 2,694,527
Patented Nov. 16, 1954

2,694,527

PARKING LOT HEATING SYSTEM

Edward A. Russell, Chicago, and Norman O. Kirkby, Elmhurst, Ill., assignors to Vapor Heating Corporation, Chicago, Ill., a corporation of Delaware Application March 22, 1951, Serial No. 216,980

10 Claims. (Cl. 237—8)

This invention has to do with improvements in parking lot heating systems.

Such systems are used by bus and truck operating companies at terminals and major intermediate traffic points where considerable numbers of buses or trucks may be parked out of doors between runs for substantial periods, and their function is to keep the parked buses and trucks warmed up and ready for use in cold weather, without idling the engines.

One of the primary objects is to provide a parking lot heating system in which an automatically controlled steam generator may be advantageously employed as a source of heat for heating a liquid which is circulated through the engine jacket and for space heating equipment of a bus or truck stationed in the parking lot.

Another object is to provide a parking lot heating system which is as nearly as possible fully automatic in operation and, in addition, adapted to cope with various abnormal conditions which could result in injury to the equipment in the absence of the automatic safeguards hereinafter described.

The invention may be described briefly as comprising an automatically controlled heat exchanger for heating a liquid. The heated liquid is pumped through a piping system to one or more stations, each station including a system of piping for delivering the heated liquid into the coolant circulating systems of one or more automotive vehicles. When the vehicle is provided with a space heating system, the piping system of such station may be connected also with such heating system.

In order to avoid the necessity of continuous personal attention and supervision of the steam generator and the several stations for supplying heated water to vehicles, the control system includes a plurality of control devices which are automatically operated to control the delivery of fuel to the fire chamber of the steam generator in relation to the demands for heat, and particularly to avoid the delivery of fuel into said heating chamber during the starting of the steam generator or at any other time when the said steam generator is not receiving an adequate supply of water. Also other control devices regulate the delivery of fuel to the generator in relation to the temperature and to the pressure of the steam generator. Certain of the control devices are designed to function to give an appropriate signal in the event that the generator fails to start or fails to operate properly in other respects.

The operation of the heat exchanger of each station is controlled in relation to the temperatures at the delivery and return ends of the liquid circulating system, the controls for accomplishing this result being adapted to energize visual and/or audible signals to notify the parking lot attendant in the event that conditions develop, at any one of the several stations requiring the personal attention of said attendant.

The invention is illustrated in the accompanying drawing wherein:

Figs. 4 and 5 are front and side elevational views of a unit comprising the equipment at each of the several bus or truck parking stations indicated in Fig. 1;

Fig. 6 is a diagrammatic but more detailed illustration of an individual bus or truck parking station, together with the steam generator and piping arrangement;

Fig. 7 is a piping diagram of the steam generating unit;

Figure 1:
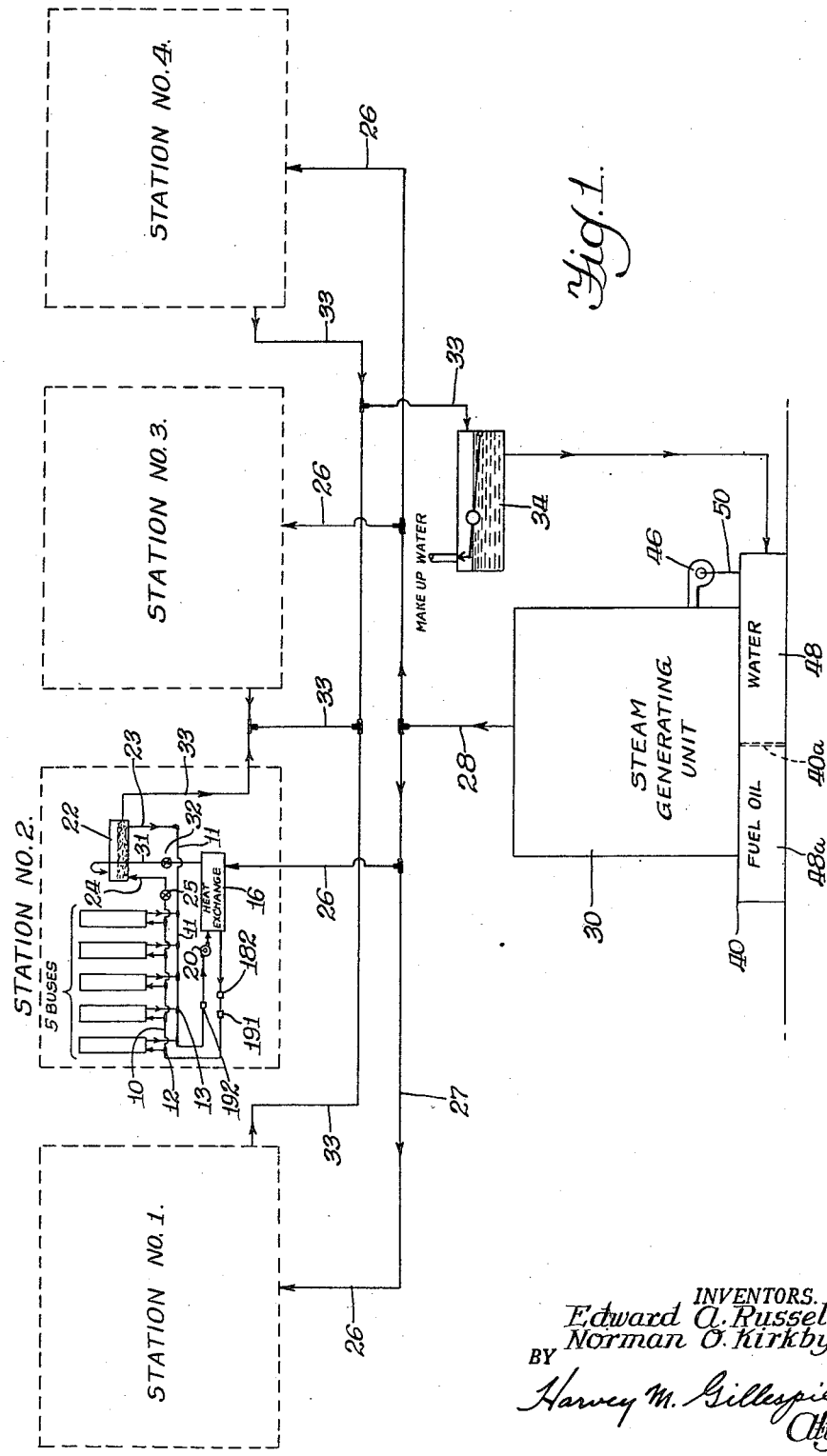
Fig. 1 is a diagrammatic layout of a parking lot heating system embodying the subject invention.

The installation indicated diagrammatically in Fig. 1 comprises four bus or truck parking stations numbered 1, 2, 3 and 4, respectively, but the number of stations and the number of vehicles served by each station may be different in different installations.

At station No. 2, Fig. 1, there is shown a group of five vehicles, buses or trucks, or both; that being the total number the station is designed to receive. Each of the other three parking stations may, when practicable, be duplications of station No. 2, although that is not necessarily the case.

Each vehicle is equipped with conventional hot water inlet and outlet fittings communicating with the engine water jacket and, in the case of buses, the body heating system may be included. Each time a bus or truck enters its parking space during cold seasons it is connected via said fittings and suitable hoses to a pair of header pipes or manifolds 10 and 11 which are provided with T-fittings 12 and 13, respectively, see Fig. 6, each adapted for connection to one end of a hose. The equipment and piping at each parking station is shown by way of a piping diagram in Fig. 6; but the actual installation is the self-contained unit illustrated in Figs. 4 and 5 and identified as a whole by reference numeral 15.

The make-up of an individual unit 15 can be described most understandably by referring especially to Fig. 6, which shows the several components spread out in a common plane. The actual physical arrangement depicted in Figs. 4 and 5 will thereafter be evident from the drawing itself. Each said unit comprises a heat exchanger 16 consisting of a tank enclosing a coil or the like of tubing 17, the ends of which are connected, respectively, to the headers 10 and 11 via conduits 18 and 19, the former of which includes a motor-driven pump 20. An expansion tank 22 supplies water to the header 11 by way of pipe 23 and is connected through a pipe 24 and pressure relief valve 25 to the header 10. Water flowing through the coil 17 is heated by steam conducted to the heat exchanger 16 through a pipe 26 connected to a steam main 27 which, in turn, is connected by way of a pipe 28, Fig. 1, to a steam generating unit 30. The condensation from heat exchanger 16 is conducted to the expansion tank 22 through a pipe 31 in which is interposed a trap 32. Overflow from the expansion tank 22 is conducted through a pipe 33 to a reservoir 34. In Fig. 6 a vehicle engine 35 is shown connected to a pair of T-fittings 12 and 13 through what may conveniently be flexible hoses 36 and 37.

Assuming the pump 20 to be operating and that steam is being supplied to heat exchanger 16, water flows from header 10 to the water jacket of engine 35 via hose 36, and thence via hose 37 to header 11, pipe 18 and pump 20 back to the coil 17 of the heat exchanger. The heated water thus supplied to the vehicle engine may also pass through the body heating system 35a and serve to keep the vehicle in condition for reception of passengers.

From the overall point of view, the system above described is quite simple; but for practical and economic reasons the system is provided with automatic controls and visual and audible signals so as to avoid the necessity of continuous personal attention of an attendant. These controls will be described in their appropriate order and with particular reference to the electrical diagram of Fig. 8.

Figure 2:
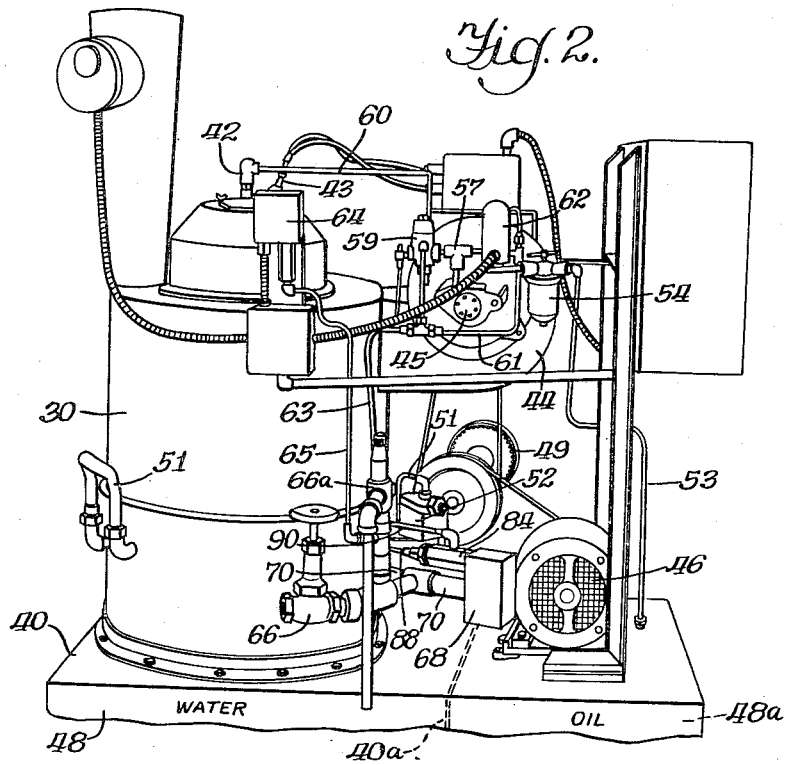
Fig. 2 is a view, in elevation, of a steam generator unit, including various appurtenances.
Figure 3:
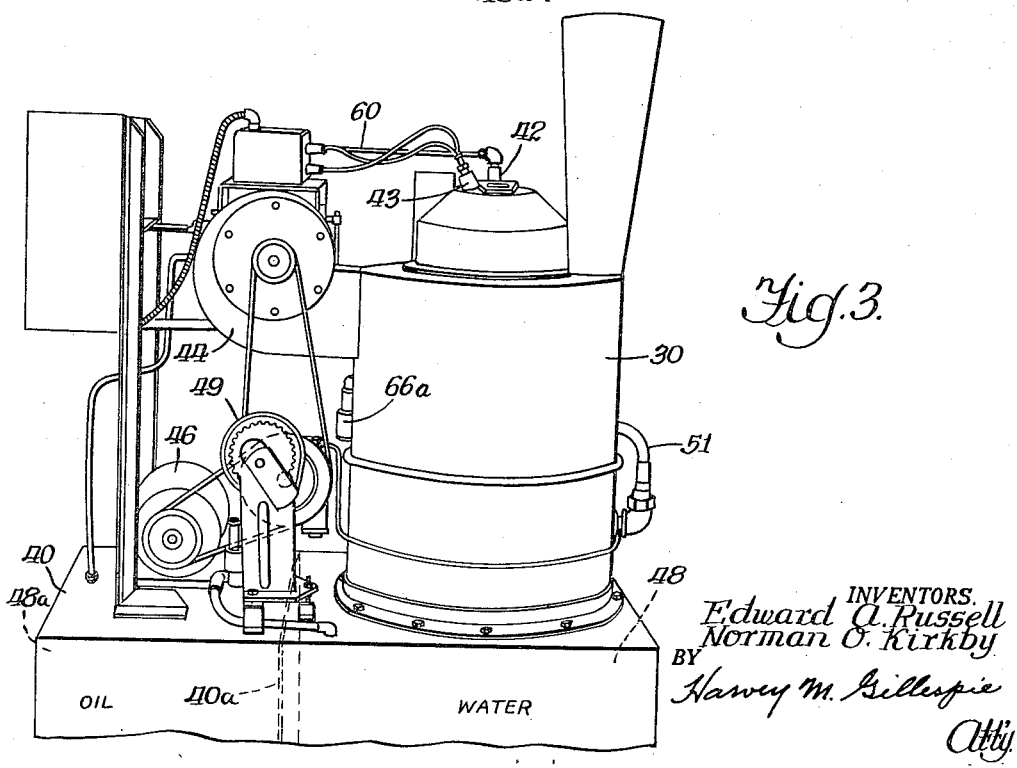
Fig. 3 is a view from the rear of Fig. 2.
Figure 7A:
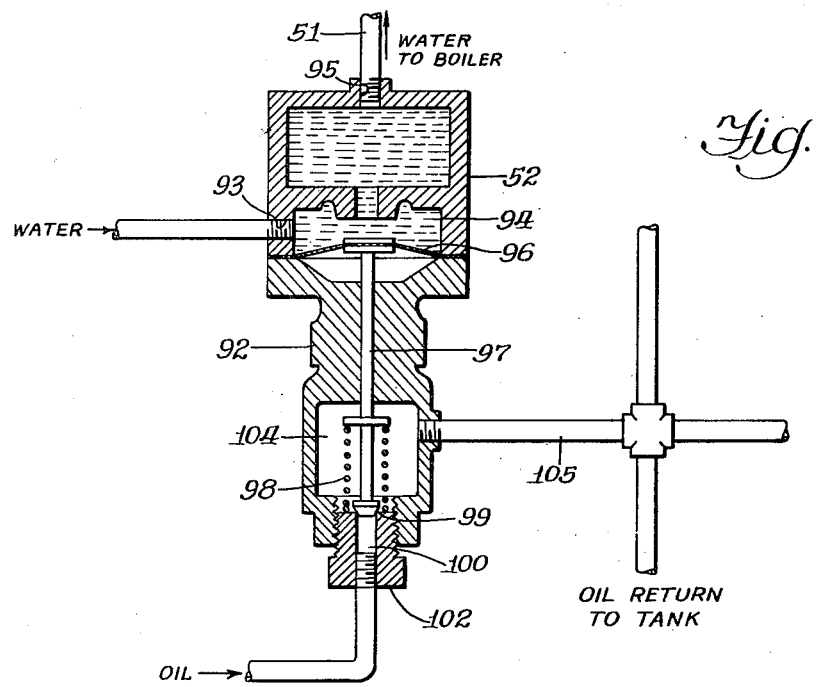
Figs. 7a and 7b are enlarged details of control elements shown in Fig. 7 for controlling the delivery of fuel to the steam generator.
Figure 7B:
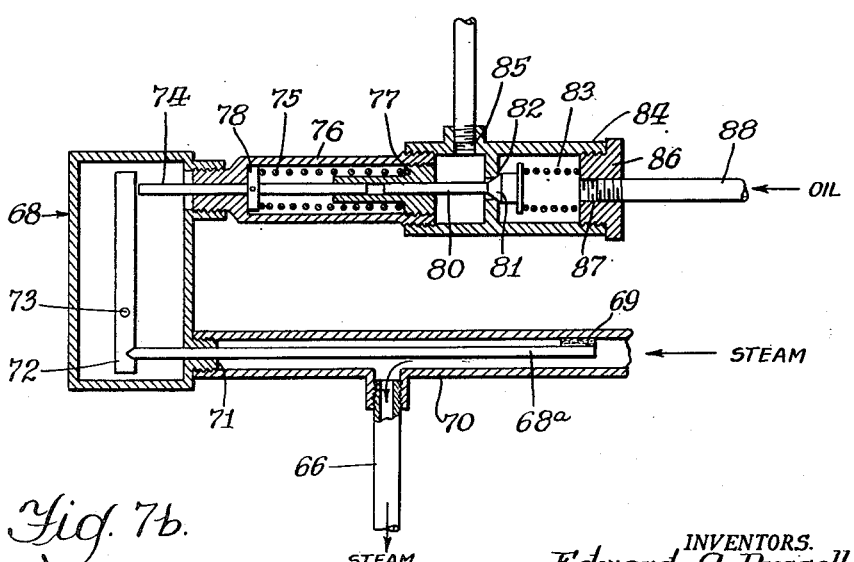

The steam generating unit, identified as a whole by reference numeral 30, is shown in Figs. 2 and 3 and the fuel and water piping are shown in Fig. 7.

Referring to Fig. 7, and incidentally to Figs. 2 and 3, the steam generating unit 30 is illustrated as including a water tube boiler comprising a group 41 of concentric coils of tubing connected in series, and a fuel burner comprising a spray head 42 and spark plug 43 which serves to ignite the atomized fuel. A blower 44 and a fuel pump 45 are connected to a common shaft and driven by an electric motor 46. The blower and fuel pump supply air and fuel, respectively, to the steam generator. The base portion 40 of the generator is a tank which is divided by a wall 40ª into two compartments 48 and 48ª. The compartment 48 constitutes a water supply tank for the generator from which water is delivered to the steam generator by a pump 49 powered by the motor 46, the intake pipe being numbered 50 and the delivery pipe 51. A hydrostatically operated valve 52 included in the pipe 51 and adapted to energize a control of the fuel delivery to the spray head 42 will be described later.

Fuel oil is supplied to the fuel pump 45 through an intake pipe 53 leading from the fuel compartment 48ª of tank 40 through a strainer 54. A conduit connection 56 leads from the pump to one port of a three-way fitting 57, from which the fuel normally proceeds by way of a pipe 58, relief valve 59 and pipe 60 to the spray head 42. The function of relief valve 59 is to prevent the building up of excessive fuel pressure at the spray head. It is adjusted to open at a predetermined maximum allowable pressure, and when open it allows fuel oil to be diverted via conduit 63 back to the fuel supply tank 48ª. A by-pass pipe 61 connects the fitting 57 with the fuel return conduit 63 through a normally closed but energized open solenoid operated valve 62, which upon being opened diverts all of the fuel oil back to the fuel supply tank 48ª. The solenoid 127 (Fig. 8) of valve 62 is electrically connected, indirectly, to a pressure-operated switch 64, which is connected by way of a conduit 65 to the steam discharge pipe 66. If the steam pressure exceeds a selected value, for example, 150 lbs. per square inch, the switch 64 will open and thereby deenergize relay 126 and thereby energize open solenoid valve 62. Thereupon, the supply of fuel oil is diverted away from the spray head until the steam pressure returns to an ascertained lower value. To avoid recurrent opening and closing of the switch 64 at substantially the same pressure, it is designed to remain open until the pressure falls to a predetermined lower pressure.

The said pressure controlled switch 64 will normally so control the operations of the boiler that the delivery steam will be maintained below a predetermined maximum temperature. However, if the temperature of the steam in delivery pipe 66 should rise above a predetermined maximum, a thermal device 68, shown diagrammatically in Fig. 7b, functions to open valve 84 and thereby divert the fuel oil away from the spray head 42. The division of oil may be only initially sufficient to reduce the flame. However, if the excessive temperature of the steam continues to rise, the valve 84 will be opened sufficiently to divert all of the oil and thereby shut off the fire from the boiler.

The thermal device 68 of the present disclosure is set to begin opening valve 84 when the temperature of the steam stands at 325°. However, this setting may be varied for different installations. This device comprises an expansion rod 68ª having preferably a high thermal coefficient of expansion, one end of which is anchored, as at 69, to the interior of the steam discharge tube 70 forming a continuation of the inside coil of tubing group 41. Said rod is slidably supported at 71 and bears endwise against one arm of a lever 72 which is pivoted at 73. The other arm of lever 72 engages one end of a push rod 74 which is yieldably held in contact with the lever by a coil spring 75 enclosed within a cylindrical housing 76, which is internally threaded to receive an externally threaded bushing 77. Said bushing functions as an abutment for one end of spring 75 while the other end bears against a collar 78 secured to the push rod 74. The bushing 77 also serves as a guide for one end of push rod 74 and also for a valve stem 80, which is integral with a valve member 81 designed to engage a valve seat 82 and normally pressed thereagainst by a valve closing spring 83. Also normally, the adjacent ends of the push rod 74 and valve stem 80 are spaced apart and, consequently, the valve 81 is normally closed. But due to the fact that the expansion rod 68 has a higher co-efficient of expansion than the tube 70 to which it is anchored, rising steam temperature causes clockwise rotation of lever 72, as viewed in Fig. 7b, and thus produces a displacement of push rod 74 which causes it to engage valve stem 80 and thereby force the valve member 81 off its seat. Valve housing 84 has a discharge port 85 and is closed at one end by a screw plug 86 having an intake port 87. It will be evident that communication between discharge port 85 and intake port 87 is normally cut off by the closed valve 81.

When the valve 81 is opened, its intake port is connected by way of conduit 88 to the fuel pipes 58 and 60 through the medium of relief valve 59, which serves in this respect only as a three-way fitting; the discharge port 85 of the valve being connected by way of a conduit 90 to the oil return conduit 63.

The function of the previously mentioned hydrostatic valve 52 is to extinguish the fire in event of a failure of feed water pressure and to make certain that the coils 41 are supplied with water before fuel is delivered to the spray head 42 at sufficient pressure to be delivered into the fire chamber of the steam generator 30. This valve is shown in substantial detail in Fig. 7a. It includes a housing 92 having a feed water intake port 93 leading into a pressure chamber 94, and a discharge port 95 leading from said chamber. A piston, preferably in the form of a flexible diaphragm 96, constitutes the bottom wall of chamber 94 and is connected to the upper end of a valve stem 97 which is biased upwardly by a coil spring 98 and has a needle point 99 at its lower end adapted to close the upper end of an axial opening 100 in the threaded bushing 102. Whenever the hydrostatic pressure in chamber 94 is sufficient to overcome the opposing force of spring 98 the needle valve 99 is seated; and that is the condition which normally obtains when the steam generator is in operation. The fuel oil by-pass conduit 88 is connected through a branch conduit 103 to the bore of bushing 102 and thence, whenever the needle valve is unseated, to the return conduit 63 by way of chamber 104 and pipe 105. Should the feed water pressure fail for any reason while the fuel pump 45 is in operation, the fuel oil pressure at the spray head 42 will be so greatly reduced by diversion of fuel via conduit 88 and valve 52 that there will be no fire in the heating chamber of the steam generator.

Figure 8:
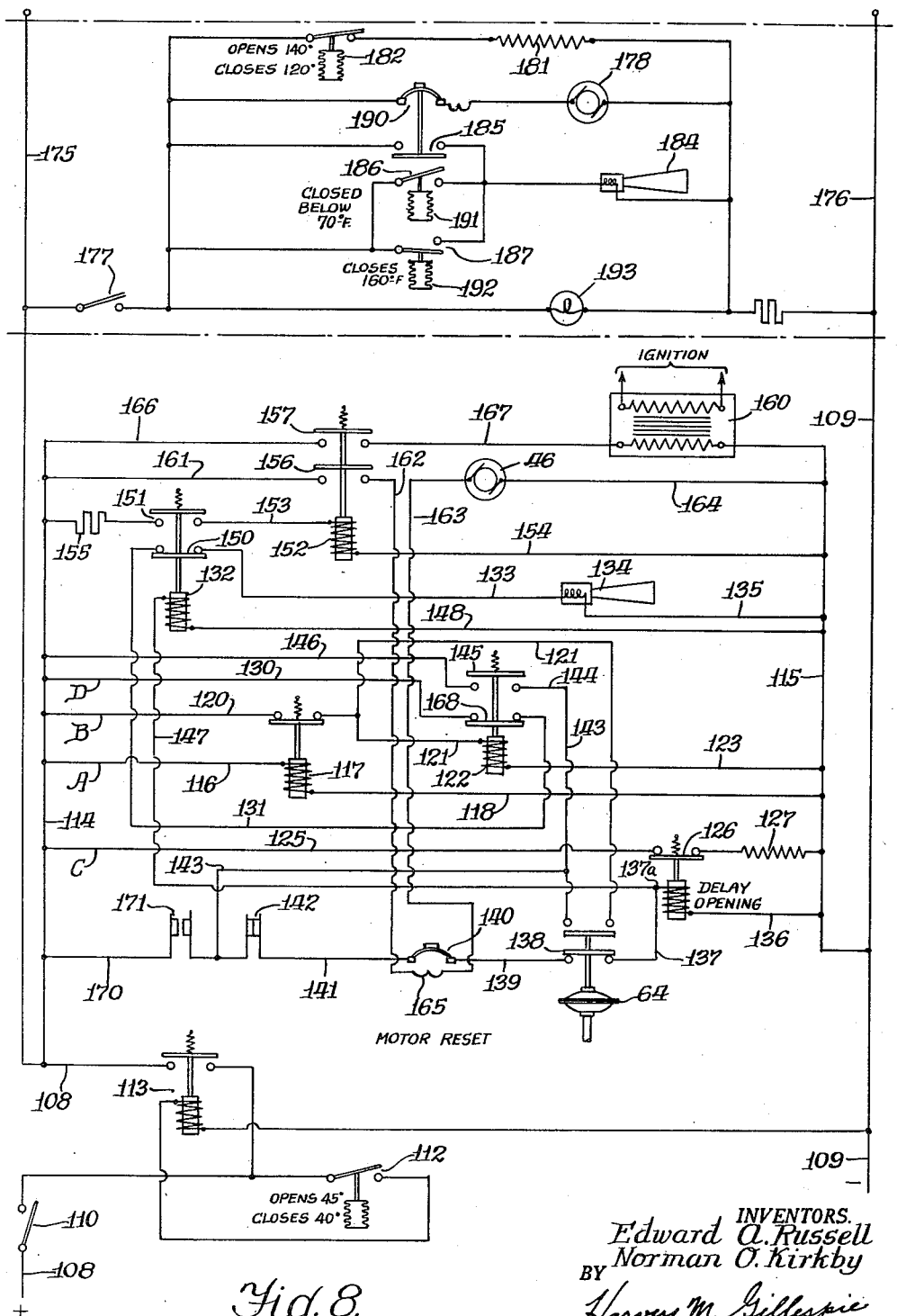
Fig. 8 is a wiring diagram of the electrical control circuits.

It remains now to consider the electrical controls and automatic safeguards illustrated schematically in Fig. 8, to which attention is now directed.

Current for the motors as well as the several electrically actuated relays and switches and the ignition coil is obtained from line conductors 108 and 109, and may be either A. C. or D. C.

Assuming the main switch 110 to be closed, and further assuming that the ambient temperature of the parking lot has dropped to a prescribed value such, for example, as 40° F., a starting circuit will be completed from the conductor 108 through the contacts of a thermostatic switch 112 and the winding of a line relay 113. The thermostatic switch 112 is of known construction adapted to close at 40° F. and to re-open when the ambient temperature reaches 45° F. Those temperatures, of course, are more or less arbitrary and subject to change. Energization of relay 113 closes through its contacts several parallel circuits between the power conductors 114 and 115, which, in turn, are connected respectively to the main supply conductors 108 and 109. These parallel circuits are designated as a whole by letters A, B, C and D and are as follows:

Circuit A includes conductor 116, the winding of relay 117 and conductor 118;

Circuit B includes conductor 120, the contacts of relay 117, conductor 121, the winding of relay 122, and conductor 123;

Circuit C includes conductor 125, the contacts of relay 126, and the winding 127 (Fig. 8) of the normally closed solenoid valve 62 (Fig. 7); and Circuit D includes conductor 130, the normally closed contacts 168 of relay 122, conductor 131, the normally closed contacts 150 of relay 132, conductor 133, horn 134 and conductor 135.

Relay 117 is slow opening, its contacts remaining closed for three seconds following energization. Relay 122 is quick acting but slow releasing. It releases forty-five seconds after the opening of its energizing circuit, for example the opening of the contacts of relay 117—that is, forty-eight seconds following closure of the contacts of relay 113. Energization of relay 122 opens the horn circuit D and thus prevents the horn 134 blowing at this time. The closing of the normally open contacts 145 of relay 122 establishes energizing circuits for the windings of relays 126 and 132. The circuit thus established through the winding of relay 126 includes power conductor 114, conductor 146, contact 145 of relay 122, conductors 144 and 143, normally closed contacts 42 of overhead stack switch, conductor 41, motor reset switch 140, conductor 139, the normally closed contacts 138 of the pressure operated switch 64, conductor 137, winding of relay 126 and conductor 136 to the power conductor 115 and negative line 109. The circuit concurrently established through the winding of relay 132 includes conductors of the previous circuit to terminal 137ᵃ and thence through conductor 147, winding of relay 132 and conductor 148 to the negative branch 115 leading to the negative line 109.

Relay 126 is of the delayed action type and opens its contacts five seconds after energization. For that reason the solenoid 127 of by-pass valve 62 remains energized for five seconds. This is effective to hold the by-pass open and thus divert fuel oil away from the fuel supply pipe 69 and spray head 42 for a like initial period; and the reason for so doing is to delay delivery of fuel oil to the burner until the feed water has started flowing through coils 41.

Energization of relay 132 opens its contacts 150, thus breaking the horn circuit D, and closes its contacts 151, thereby establishing a circuit through the winding of a solenoid switch 152 via conductors 153 and 154 and a current limiting resistor 155. Energization of switch 152 closes contacts 156 and 157 which are included respectively in the circuits of motor 46 and the primary winding of ignition coil 160. The motor circuit includes conductors 161–164 inclusive and the winding 165 of an overload circuit breaker of which the reset switch 140 is a part. The ignition coil primary circuit includes conductors 166 and 167.

In forty-eight seconds after energization, relay 122 returns to normal, thus opening contacts 145 and closing contacts 168. This opens the previously traced circuits of relays 126 and 132; but in the meantime the fire has been started and, as a consequence, an alternative circuit path has been established which normally serves to keep those relays energized notwithstanding the opening of contacts 145. The alternative path includes the conductor 170 and closed contacts 171, which latter are located in the stack and closed thermostatically within thirty seconds after the fuel is ignited. It will be observed that the alternative path comprising conductor 170 and contacts 171 is in shunt to contacts 145.

If contacts 171 should fail to close before contacts 145 open, relay 126 will close its contacts, thereby energizing solenoid 127, which opens the by-pass valve 62; but relay 132 has a delayed action upon de-energization and, as a result, contacts 150 will remain open and contacts 151 closed for an interval of one minute. Thus, the blower and ignition coil are maintained in operation, subsequent to the opening of the by-pass valve, for a period of sufficient duration to ensure combustion of any residue of fuel discharged from nozzle 42 and which might otherwise remain unconsumed in the firebox.

The closure of contacts 150 concurrently with the closure of contacts 168 completes the circuit of horn 134 and thus brings about an audible announcement of the fact that the steam generator is not functioning.

If, notwithstanding the previously described provision for thermostatic regulation, the steam pressure should reach a predetermined excessive value such, for example, as 150 lbs. per square inch, the pressure-operated device 64 will open its normally closed contacts 138 and at the same time close its normally open contacts 172. Since contacts 145 are already open, the opening of contacts 138 de-energizes relay 126, thereby energizing solenoid 127, causing the fuel oil to be diverted from the burner. The closing of contacts 172 establishes a secondary circuit through the winding of relay 122, thereby energizing that relay. The latter circuit embraces conductor 170, contacts 171, conductors 143 and 144, contacts 172, conductor 121, the winding of relay 122, and conductor 123. In this instance the reason for energizing relay 122 is to interrupt the circuit of horn 134 by opening contacts 168 and set up the circuits for automatic starting of the boiler when the pressure switch 138 is reclosed.

The thermostatically controlled contacts 142, located in the stack, are normally closed and set to open only in event of the stack temperature exceeding a predetermined maximum safe value. Opening of said contacts de-energizes relay 126, closing the contacts of the latter and thus energizing solenoid 127 of fuel valve 62 to divert the supply of fuel oil from the spray head 42. At the same time relay 132 is deenergized, but there is a one-minute delay in the restoration of the latter to normal. Consequently, contacts 151 remain closed and contacts 150 remain open throughout the one-minute interval. Hence, the motor 46 and ignition coil 160 remain energized. The one-minute interval should be adequate to consume any surplus oil which may drip from the spray head and also provide adequate time for the air delivered to the fire chamber to reduce the stack temperature sufficiently to again close contacts 142; but if for any reason the generator fails to resume operation within said one-minute period, the contacts 150 of relay 132 will close and thereby complete the circuit through horn 134. It will be seen that abnormal conditions which are automatically corrected will not cause the horn to blow, whereas the stack switch contacts 171 at any time after automatic operation of the boiler or a failure of contacts 171 to close within the time limit during starting results in energizing said horn 134.

The upper portion of Fig. 8 is a schematic diagram of the thermostatic and electrical controls at any one of the four indicated parking stations, Fig. 1. It will be understood that this portion of the diagram will be duplicated for each of the several stations shown in Fig. 1. Current is supplied to the several stations through conductors 175 and 176, the former of which is shown to be in series with the main switch 110 and the contacts of relay 113. It will be evident that the current supply to the several stations is cut off whenever the ambient temperature is above 45° F. or other temperature at which the contacts of thermostatic switch 112 may be set to open.

Assuming the ambient temperature to be low enough to initiate operation and that one of the parking stations, for example station No. 2, has been preconditioned for use by closure of switch 177, the motor 178 which drives pump 20 will be energized. Water will thereupon start circulating through the coil 17 of the heat exchanger 16 and the header pipes 10 and 11 as well as through the engine water jackets of any vehicles, for example buses, trucks, diesel locomotives, etc., which may be connected to the heating system as previously described.

It is desirable to maintain the circulating water at a temperature which is not excessive—say 140° F.— to that end there is included in the steam pipe 26, Fig. 6, a solenoid-operated valve 180 which closes upon deenergization to interrupt the supply of steam to the heat exchanger. The solenoid winding 181 of said steam valve 180 is shown, Fig. 8, to be in series with the contacts of a thermostatically-operated switch 182 in the hot water delivery pipe 19, see Fig. 6. Whenever the solenoid winding 181 of said steam valve 180 is de-energized the supply of steam to the heat exchanger 16 is cut off; and that is also a condition which obtains inherently whenever the current supply to the station is interrupted, as by opening switch 177, or whenever the contacts of any one of the switches 182, relay 113, thermal switch 112 or line switch is open. Thus, if the temperature of the water in pipe 19 exceeds a predetermined magnitude such as 140° F., the steam supply is interrupted until the temperature of the delivered water is reduced to a lower value at which said contacts will again close. This may be a considerably lower value such as 120° F. In fact the controls are intended to maintain the temperature of the delivered water within the range of 120° F. to 140° F.

In addition to shutting off the supply of steam to the heat exchanger 16 when the delivery water reaches 160° F., it is desirable to give an audible signal when the temperature of the water reaches the upper limits of the prescribed temperature range. To this end the contact 186 of a thermal switch 191 is closed when the temperature of the delivered water in pipe 19 reaches 160° F. The closing of switch 186 energizes the signal horn 134. Consequently, if the signal persists the parking lot attendant is thereby informed that some abnormal condition exists which requires his personal attention.

If the return water in pipe 18 falls below the temperature of 70° F., it is desired that such condition be brought to the attention of an attendant. Consequently, when the return water in pipe 18 falls to a temperature of 70°, the contact 187 of thermal switch 192 is closed so as to energize the signal horn 134 and thereby attract the attention of the parking lot attendant.

The normally open contacts 185 are associated with an overload circuit breaker 190 and will close whenever the circuit breaker is actuated to open the motor circuit.

A pilot lamp 193 in series with switch 177 is lighted whenever its station is in service and the ambient temperature is low enough to effect a closure of the contacts of relay 113. Through this provision incoming drivers are at once informed which of several stations having unoccupied parking space are in condition for use.

In certain of the appended claims there are included the designations: "first electromagnetic relay," "second electromagnetic relay," "third electromagnetic relay" and "fourth electromagnetic relay." As an aid to interpreation of such claims, it is pointed out that the above designations can be applied to the disclosure as follows:

"first electromagnetic relay": relay 132
"second electromagnetic relay": relay 126
"third electromagnetic relay": relay 122
"fourth electromagnetic relay": relay 117

While the description is limited to a single preferred embodiment, it should be self-evident that the invention is susceptible of many possible modifications within its scope and purview. Accordingly, the scope of the invention is not to be limited otherwise than as clearly indicated by the terms of the claims hereinafter set forth.

We claim:

1. In a parking lot heating system, a parking station having a hot water circulating system including a heat exchanger having water intake and discharge ports, a hot water pipe line connected at one end to said discharge port and at the other end to an expansion tank and having at least one outlet intermediate said heat exchanger and said expansion tank adapted for connection to a motor vehicle engine water jacket to replenish and maintain a supply of hot water therein, a return pipe line connected at one end to said expansion tank and at the other end to said intake port and adapted for connection to at least one motor vehicle engine water jacket, a pump for circulating water through said heat exchanger and pipe lines and the water jacket of any engine or engines which may be connected to said pipe lines, a steam generator, a steam supply line connecting said steam generator with said heat exchanger, means for delivering condensate from the heat exchanger to the hot water circulating system to replenish the water supply therein, and means for automatically controlling the operation of said steam generator.

2. In a parking lot heating system, a plurality of parking stations each equipped with an individual water circulating system comprising a heat exchanger having water intake and discharge ports, a hot water pipe line connected at one end to said discharge port and having a plurality of outlets each adapted for connection to a motor vehicle engine water jacket to replenish and maintain a supply of hot water therein, a return pipe line connected at one end to said intake port and having a plurality of inlets each adapted for connection to a motor vehicle engine water jacket, a power-driven pump in one of said pipe lines, a steam generator for supplying steam to said parking stations collectively, steam delivery pipes connecting said steam generator with said heat exchangers individually, a feed water supply reservoir for the steam generator, an overflow pipe connecting said expansion tank to the steam generator feed water supply, a pipe line interconnecting the heat exchanger with the expansion tank for conveying steam condensation to said expansion tank to replenish the water supply of the hot water circulating system, and a steam trap interposed in the last mentioned pipe line.

3. A parking lot heating system according to claim 2 wherein each said steam pipe includes a solenoid-operated valve which is normally closed and which opens upon energization of its solenoid, and a normally closed thermo-responsive switch in series with said solenoid and a current supply source, said switch being thermally associated with one of said water pipe lines and operative to open its contacts in response to water temperature above a certain predetermined value.

4. A parking lot heating system including a hot water heater and circulating system and an automatically controlled steam generator for supplying steam as a heating medium to said water heater; said steam generator including a fluid-fuel burner, an electromagnetic valve for controlling the supply of fuel to the burner, a motor driven feed-water pump for the generator, a first electromagnetic relay controlling the power circuit of the pump motor and operative upon energization to close said power circuit, a second electromagnetic relay operative upon energization to cause said electromagnetic valve to direct a supply of fuel to the burner, a third electromagnetic relay having normally open contacts in series with the windings of said first and second relays, an energizing circuit for said first and second relays including the normally open contacts of the third relay, a pair of normally open thermostatically controlled contacts in shunt to the normally open contacts of the third relay, said thermostatically controlled contacts being operative to close in response to a predetermined temperature developed by the fuel burner, and a fourth electromagnetic relay having normally closed contacts in the energizing circuit of said third relay, said fourth relay having delayed action upon energization so that its said contacts remain closed for a predetermined interval following energization, said third relay having delayed action upon de-energization so that its said normally open contacts remain closed following de-energization of said fourth relay for an interval of sufficient duration normally to ensure closure of said thermostatically controlled contacts, the defined arrangement being such that the fuel supply to the burner is temporarily reduced or wholly interrupted for a predetermined interval each time the system is put into operation, the feed-water pump being in operation during said last-mentioned interval.

5. A parking lot heating system according to claim 4 characterized in that said valve is included in a fuel by-pass conduit and is closed when its solenoid is de-energized, said third relay having normally closed contacts in the energizing circuit of the valve solenoid.

6. A parking lot heating system according to claim 4 including normally closed thermostatically controlled contacts in the energizing circuit of said third relay, said contacts being adapted to open in response to a predetermined excessive temperature developed by the fuel burner, the arrangement being effective to reduce or cut off the fuel supply to the burner in event of such excessive temperature.

7. A parking lot heating system according to claim 4 including a blower for supplying forced draft to the burner, said blower being driven by said motor, said first relay having a predetermined delay interval following de-energization so that said blower is kept in operation throughout said interval after the fuel supply has been reduced or cut off.

8. A parking lot heating system including a water heating and circulating system including an automatically controlled steam generator for supplying steam as a water heating medium; the steam generator and its automatic controls including a fluid-fuel burner, an electromagnetic valve for controlling the supply of fuel to the burner, a blower for supplying forced draft to the burner, an electric motor for driving the blower, a first electromagnetic relay controlling the power circuit of the motor and operative upon energization to close said power circuit, a second electromagnetic relay operative upon energization to cause said valve to direct a supply of fuel to the burner, a third electromagnetic relay having normally open contacts in series with the windings of said first and second relays, an energizing circuit for said first and second relays including the normally open contacts of the third relay, a pair of normally open thermostatically controlled contacts in shunt to the normally open contacts of the third relay, said thermostatically controlled contacts being operative to close in response to a predetermined temperature developed by the fuel burner, a fourth electromagnetic relay having normally closed contacts in the energizing circuit of said third relay, said fourth relay having delayed action upon energization so that its said contacts remain closed for a predetermined interval following energization, said third relay having delayed action upon de-energization so that its said normally open contacts remain closed following de-energization of said fourth relay for an interval of sufficient duration normally to ensure closure of said thermostatically controlled contacts, a steam-pressure actuated switch having normally closed contacts in the energizing circuit of said second relay and operative in response to a predetermined steam pressure in the generator to open its said contacts and thus de-energize the second relay.

9. The system of claim 8 characterized in that said first relay has normally closed contacts which are open when said first relay is energized, an audible signal device having an energizing circuit including the said normally closed contacts of the first relay, said third relay having normally closed contacts in series with the normally closed contacts of the first relay, the arrangement being such that said signal device will operate if said thermostatically controlled contacts fail to close within a predetermined interval following application of operating voltage to the system.

10. The system of claim 9 including an alternative energizing circuit for said third relay, not including the contacts of said fourth relay, said alternative circuit including normally open contacts which are operative to close in response to predetermined steam pressure in the generator, whereby to energize said third relay and thus interrupt the energizing circuit of said audible signal device.

References Cited in the file of this patent

UNITED STATES PATENTS

| Number | Name | Date |
|---|---|---|
| 710,566 | Donnelly | Oct. 7, 1902 |
| 996,129 | Peck | June 27, 1911 |
| 1,116,690 | Gibson | Nov. 10, 1914 |
| 1,234,049 | Lovell | July 17, 1917 |
| 1,764,453 | Jewell | June 17, 1930 |
| 1,905,005 | Schierloh | Apr. 25, 1933 |
| 1,964,678 | Scott | June 26, 1934 |
| 2,115,665 | De Florez | Apr. 26, 1938 |